May 17, 1955 J. D. SHAW 2,708,746

APPROACH SIGNAL SYSTEM WITH SELF-ADJUSTING CONTROL

Filed March 19, 1952 2 Sheets-Sheet 1

INVENTOR.
Joseph D. Shaw
BY
Murray, Sackhoff & Murray
ATT'YS

INVENTOR.
Joseph D. Shaw
BY
Murray, Sackhoff & Murray
ATT'YS

United States Patent Office 2,708,746

Patented May 17, 1955

2,708,746

APPROACH SIGNAL SYSTEM WITH SELF-ADJUSTING CONTROL

Joseph D. Shaw, Cincinnati, Ohio

Application March 19, 1952, Serial No. 277,450

8 Claims. (Cl. 340—258)

The present invention relates to a self-adjusting control system and concerns the use of an automatically actuated, frequency sensitive device that balances the control system to new sets of conditions as they occur in the relay pick-up antenna, and also automatically returns the control system to normal operating conditions.

In a specific commercial adaptation of my control system this invention relates to a system which produces an alarm when the pick-up antenna is disturbed by the proximity of a person or an object. My system then automatically adjusts itself to the new set of conditions imposed on it by the presence of a person or object, and upon adjustment shuts off the alarm. If the new set of conditions is disturbed by the addition of another person or object or by the closer proximity to the antenna of the aforesaid person, or object, the alarm is again actuated and upon automatic adjustment of the system to said new conditions the alarm is again shut off. My system also will adjust to its original balance if the person or persons remove themselves from the proximity of the pick-up antenna, said adjustment being made without the sounding of the alarm.

My system comprises a local oscillator oscillating at an initial frequency, said frequency being frequency modulated by conditions in an antenna pick-up device connected to it. The output of the oscillator is connected to a discriminator atuned to the initial frequency of the local oscillator, said discriminator being connected to the local oscillator by a frequency sensitive device adapted to adjust my system to a balanced condition. A detector is connected to the output of the local oscillator and is tuned to a frequency less than the initial frequency so as to detect the modulated lower frequency and operate a relay.

My invention will be further understood from the illustration of its various forms in the accompanying drawings and the detailed description thereof in the following specification.

Figure 1:
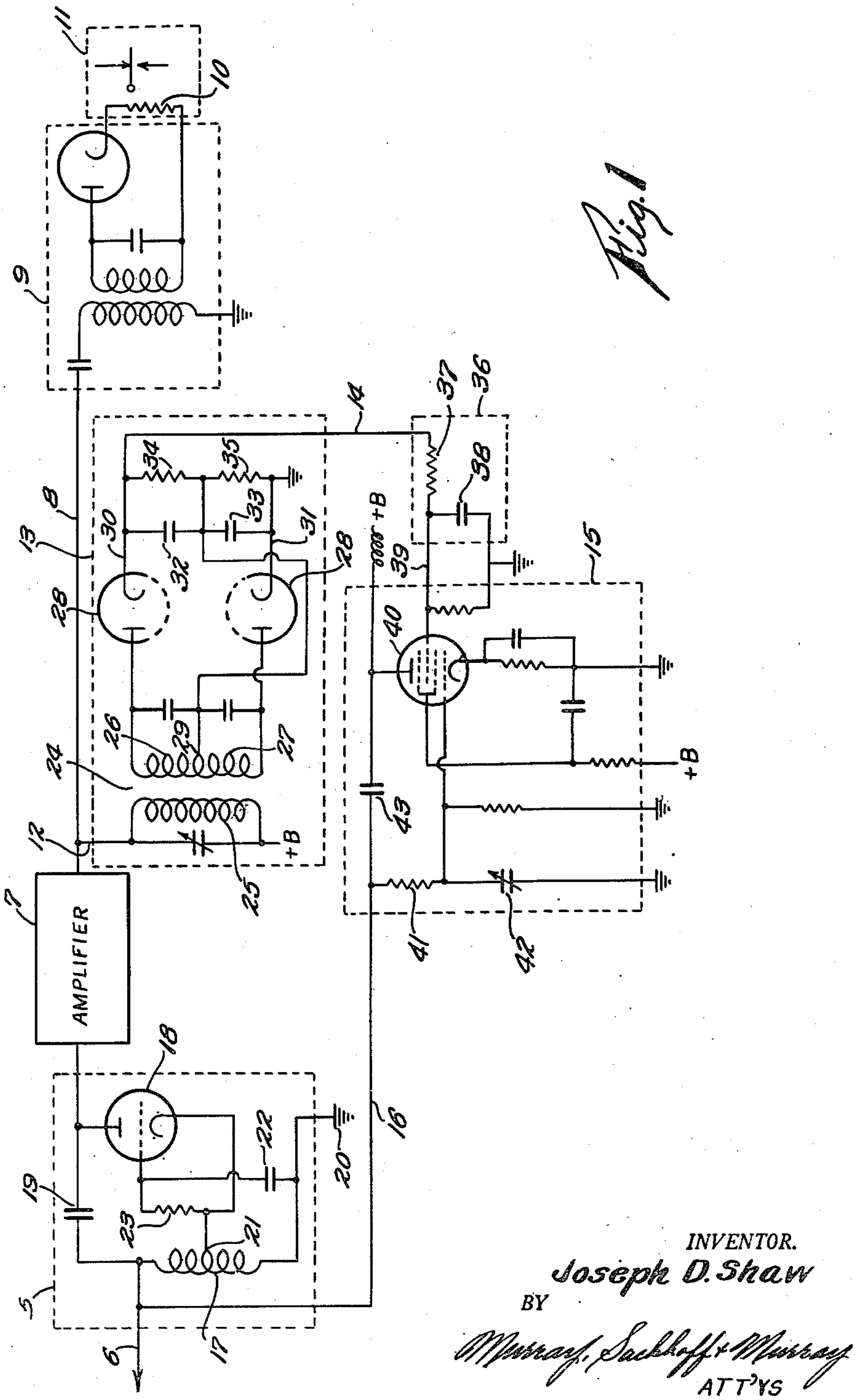
Fig. 1 is a wiring diagram of one form of my self-adjusting control system.

In Fig. 1 of the drawings the broken line rectangle 5 indicates a local oscillator circuit tuned to oscillate at an initial frequency. The oscillator is connected by a line 6 to a pick-up antenna (not shown) arranged as to length and form to provide maximum sensitivity under the particular conditions for control operation. The output of the oscillator may be amplified by an amplifier diagrammatically indicated at 7, and the amplified signal connected by a line 8 to the usual diode detector system 9. The detector is set to excite the coil 10 of a relay 11 when the frequency of the local oscillator circuit is modulated below its initial frequency. The amplifier output is also led by a line 12 to a discriminator 13 whose center frequency is the same as the initial frequency of the local oscillator. For purposes of this description let it be assumed that when the frequency of the local oscillator circuit changes from its initial to a lower frequency; as when an object or person appears in the pick-up antenna system; or when said circuit oscillates above said initial frequency; as when an object or person recedes from the antenna system; the discriminator circuit is unbalanced and creates in its output line 14 a voltage whose polarity and magnitude are proportional to the direction and amount of deviation from the center frequency, and that said voltage is applied to a reactance tube circuit 15 that in turn introduces in the antenna circuit, through line 16, a corrective modulation that is of a frequency sufficient to change the tuning of the oscillator 5 so that it again operates at substantially its initial frequency. As has been said the detector excites the coil of the relay 11 when the system is in sufficient unbalance due to a frequency lower than the initial frequency; said relay being connected to an alarm, or the like, to give a suitable warning signal of the proximity of the person or object to the antenna.

In greater detail my capacity operated relay shown in Fig. 1 has an oscillator whose parallel resonant circuit consists of an inductance represented by the coil 17 and the output of the reactance tube circuit 15 through the line 16 and by a capacitance represented by the antenna 6. One end of the circuit is connected to the plate of a triode tube 18 through a blocking condenser 19, whilst the other end of the oscillating circuit is grounded at 20. The amount of feed back in the oscillating circuit is determined by the position of a tap 21 on the coil 17. Condenser 22 and grid leak 23 are used to obtain grid bias for the tube. For the purpose of illustration it may be assumed that the local oscillator just described is tuned to oscillate at an initial frequency of 455 kilocycles per second, and that the output of this local oscillator may be led to one or more stages of amplification, as indicated by the reference numeral 7, so that amplitude limiting is obtained, if necessary. Amplifiers are so well known that a detailed description may be omitted, it being understood that the amplified, or unamplified signal from the local oscillator is connected by the line 8 to the detector circuit 9 tuned to detect frequencies less than the initial frequency of the local oscillator. In the stated example the detector may be tuned so that when the initial frequency has been modulated to a frequency equal to or somewhat less than, say, 454.5 kilocycles per second, it acts to operate the relay 11 and a suitable signal, or alarm.

As has been specified the frequency of the local oscillator 5 is led by line 12 to a discriminator 13 which has a transformer 24 with a single primary winding 25 and two separate secondary windings 26 and 27. The center or resonant frequency of the discriminator is approximately the same as the initial frequency of the local oscillator i. e. 455 kilocycles per second, the secondaries 26 and 27 being then tuned by means of movable iron cores to detect frequencies of somewhat less than 454.5 and somewhat greater than 455.5 kilocycles per second, respectively. The outside taps of secondaries 26 and 27 are connected to the two plates of a twin diode tube 28, whilst the inside taps are connected to a common center tap 29. The center tap 29 is connected to each of the cathode leads 30 and 31 of the tube 28 by condensers 32 and 33 and resistances 34 and 35, respectively. The condensers are in parallel with the resistances to act as smoothing filters.

The output of the discriminator is fed by line 14 to a reactance tube circuit 15 through a time delay circuit 36. It will be seen that when a frequency of 455 kilocycles per second is passing through the primary 25 of the transformer 24 the discriminator circuit will be in substantial balance and no appreciable voltage will develop in the output line 14. However, when say a relatively low frequency of 454.5 kilocycles per second passes through the primary, the potential across the resistance 34, derived from the secondary 26, becomes more positive than the potential across the resistance 35, derived from the secondary 27, by a certain amount, thereby causing a directed voltage between the ground and line 14. The reception of a high frequency signal of say 455.5 kilocycles per second in the primary 25 will cause the potential derived from the secondary circuit 27 to be relatively higher than the potential derived from the secondary circuit 26 to cause a voltage between the ground and line 14 in the opposite direction to that condition where the signal frequency is below the center frequency; at say 454.5 kilocycles per second, as an example.

A potential sensitive device is connected between the discriminator and the local oscillator to correct the unbalance detected by the discriminator circuit. In said device the output line 14 of the discriminator may be connected to a time delay circuit 36 consisting of a resistor 37 and a capacitance 38. The time delay circuit 36 may be omitted by increasing the time constants of resistance 34—condenser 32 and resistance 35—condenser 33. A line 39 from the time delay circuit is connected to a grid of a pentagrid tube 40 of the reactance tube circuit 15 in such a way that said circuit acts through line 16 to correct the tuning of the local oscillator provided said oscillator is operating at a frequency other than its initial frequency of 455 kilocycles per second.

With respect to this reactance tube circuit the value of a resistance 41 therein is large, as compared to the reactance of a condenser 42, so that the current existing in 41—42 will be substantially in phase with the voltage across the coil 17 and the antenna 6 of the local oscillator, the resistance 41 being connected to the local oscillator through the line 16. On the other hand the voltage across the condenser 42 lags the current by 90 degrees. The current in the plate circuit of the tube 40 will be in phase with its grid voltage. This grid voltage is derived from the capacitance of condenser 42. This grid voltage is therefore 90 degrees behind the voltage across the coil 17 and the antenna 6 of the local oscillator. The plate current of the tube 40 therefore lags the voltage across the coil 17, the lagging current being applied through a condenser 43 and the line 16 to the coil 17 and the antenna 6 which accordingly acts as an inductance in the resonant circuit of the local oscillator. The value of the plate current is determined by the voltage derived from the time delay circuit 36 through the line 39 applied to the number 3 grid of the tube 40.

Now suppose the local oscillator 5 is disturbed by a person or object within its effective range its frequency will then be lowered to say 454.5 kilocycles per second. The detector will immediately detect said frequency and operate the relay 11 which may actuate a signal, or a control, and at the same time the discriminator circuit 13 sends a voltage to the time delay circuit 36 by line 14, the voltage from said circuit being applied to the reactance tube circuit 15 through line 39. The value and direction of the said voltage conditions the reactance tube circuit to create a correcting frequency of .5 kilocycle per second in the local oscillator circuit 5 so that the latter again operates at its initial frequency of 455 kilocycles per second. The time constant of the delay circuit is sufficiently large so that the tuned detector 9 can effectively operate the relay 11 before the frequency correction is made in the local oscillator circuit. Upon correction of the local oscillator frequency the detector will be inoperative because the corrected frequency of the local oscillator is greater than the frequency of the detector circuit 9.

If the person or object recedes from the antenna pick-up of the local oscillator the frequency of the oscillator increases, in the example given, from its corrected given frequency of 455 to say 455.5 kilocycles per second. As this frequency is relatively higher than the frequency detected by the detector 9 the latter will not energize the relay 11 and no signal will be given. The discriminator circuit 13 however will detect the frequency change and act to direct a correcting voltage through line 14, time delay circuit 36 and line 39 to the reactance tube circuit 15. The value and direction of the said voltage conditions the reactance tube circuit 15 to create a correcting frequency of .5 kilocycle per second in the local oscillator circuit so that the latter again operates at its initial frequency of 455 kilocycles per second.

Figure 2:
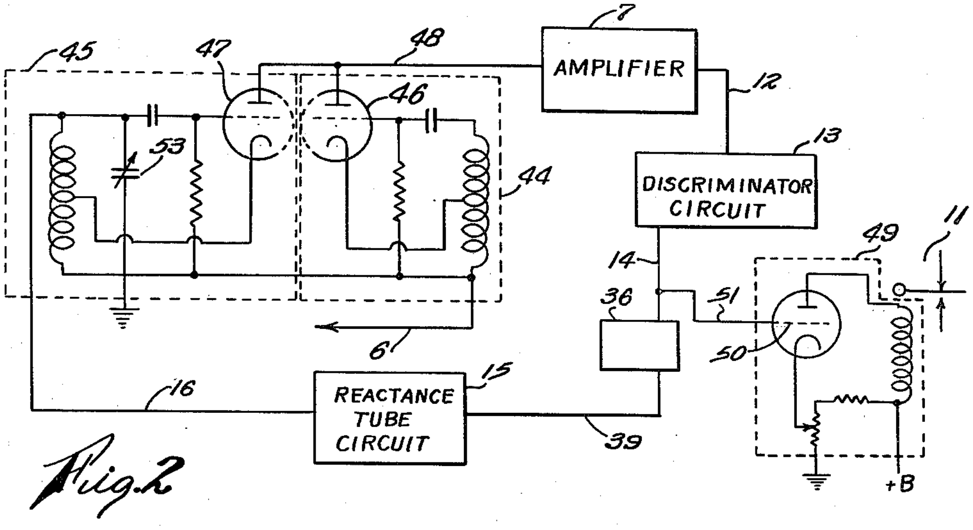
Fig. 2 is a wiring diagram of a modified control system.

The capacity operated relay shown in Fig. 1 is satisfactory for many practical purposes but in event a more sensitive relay is required I have shown in Fig. 2 a high frequency oscillator adapted to heterodyne at a beat or intermediate frequency of say 455 kilocycles per second. In this modification the numeral 44 indicates a first, local high frequency oscillator adapted to oscillate at say 2000 kilocycles per second, whilst the numeral 45 refers to a second local, high frequency oscillator tuned to oscillate at a lower frequency than the first oscillator, for instance at 1545 kilocycles per second. The first local oscillator includes the pick-up antenna 6. Tubes 46 and 47 of the oscillator circuits 44 and 45 respectively also act as a combined mixer tube by connecting their respective plates together and function to heterodyne the frequencies of the two oscillators to produce a beat frequency of 455 kilocycles per second. The output of the mixer may be connected by line 48 to the tuned amplifier 7, and from thence the output is led by line 12 to the discriminator circuit 13. The discriminator circuit output is connected to the time delay circuit 36 through line 14 and through line 39 to the reactance tube circuit 15 all in the manner described in my system shown in Fig. 1 and described in detail heretofore.

When the first local oscillator 44 is disturbed by a person or object within the effective area of the antenna its frequency may fall to 1999.5 kilocycles per second. The decrease in frequency causes the actual intermediate frequency to decrease to a frequency of 454.5 kilocycles per second. The discriminator circuit 13 detects the change in frequency and sends a voltage, which we assume to be more positive than the voltage normally developed by the discriminator 13, to the time delay circuit 36 by line 14 and thence by line 39 to the reactance tube circuit 15. The reactance tube then tends to affect the second local oscillator 45 through line 16 in such a direction that its oscillation will be reduced to 1544.5 kilocycles thereby correcting the beat frequency of the system to the initial beat frequency of 455 kilocycles.

The detector circuit 9 of Fig. 1 may be replaced in this system by a circuit 49 which is of a type that energizes the relay 11 if a positive voltage of sufficient value is applied to its grid 50. The positive voltage is developed by the discriminator circuit 13 in the manner set forth in the next preceding paragraph and is applied through lines 14 and 51 to the grid 50 and thereby causes the activation of the relay 11 provided this voltage is sufficiently positive. As the frequency correction is made the discriminator circuit voltage tends to the voltage normally developed when the center frequency is present; whereby the circuit 49 will become inoperative and relay 11 will open.

On the other hand if the person or object moves away from the effective area of the antenna the frequency of the first local oscillator 44 to which it is connected is increased to its given value of 2000 kilocycles, thus changing the intermediate or beat frequency of the oscillators to 455.5 kilocycles per second. The discriminator circuit in conjunction with the reactance tube raises the second local oscillator 45 to its original frequency of 1545 kilocycles thus placing the system in balance. It will be noted that during the unbalance the voltage from the discriminator 13 was opposite to that of the previous case and therefore more negative than the voltage normally developed when the center frequency is present whereby the relay remained inoperative during this circuit correction.

Figure 3:
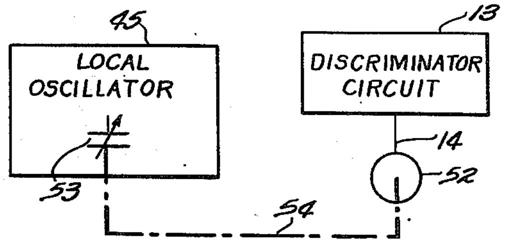
Figs. 3 and 4 are diagrammatical views of two different means for operatively connecting the discriminator and the local oscillator of my self-adjusting control system.
Figure 4:
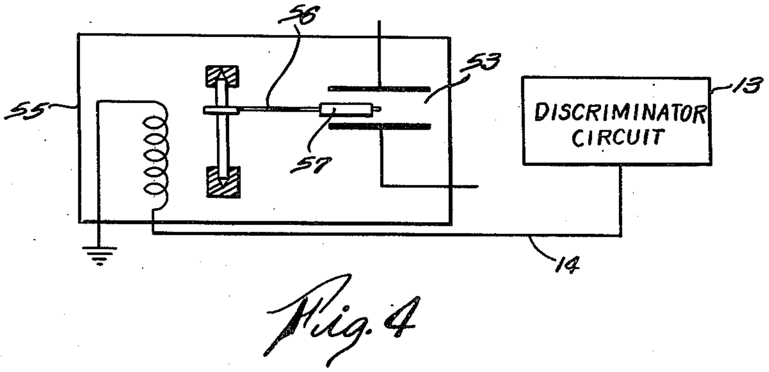

I have diagrammatically shown in Figs. 3 and 4 modifications of potential sensitive means for interconnecting the output of the discriminator 13 with either the local oscillator 5 of the control system shown in Fig. 1 or the second local oscillator 45 in the system illustrated in Fig. 2. With particular reference to Fig. 3 the output line 14 of the discriminator 13 is connected to a potential sensitive device such as a motor 52. The rotor of the said motor is mechanically connected to the movable element of a variable condenser 53 (Fig. 2) as by a shaft indicated by a dot and dash line 54. The rotatory direction of the motor will be determined by the direction of the voltage across the output line 14 of the discriminator, the motor being operative so long as an unbalance occurs in the said output line 14. As will be understood with reference to Fig. 2 the adjustment of the condenser 53 in the local oscillator will tune the oscillating circuit to compensate for the change of frequency so that the system will be again in balance.

As shown in Fig. 4 I have diagrammatically shown a potential sensitive device 55 wired to the output line 14 of the discriminator 13. The device has a rotatable arm 56 movable as to direction and extent by the direction and continuance of a voltage across the line 14. The arm has a section of a dielectric material 57 fixed to its outer end which is disposed between the plates of the condenser 53 that tunes the local oscillator for my control system. Movement of the section by the device 55 will tune the oscillator circuit so that the relay will be in balance.

What is claimed is:

1. A self-adjusting control system having a local oscillator initially adapted to oscillate at a given frequency and including a parallel resonant circuit consisting of an inductance coil and an antenna system whose capacitance is changed by the relative positions of an object with respect to the said antenna system, a discriminator connected to the output of the local oscillator and having its center frequency atuned to the given frequency of the local oscillator, and effective to change the value of its output in response to frequency changes in the local oscillator, a potential sensitive means connected to the output of the discriminator, means associated with the resonant circuit of the local oscillator for translating the output of the potential sensitive means into a corrective inductance for said circuit, and a relay actuating detector in the system adapted to operate only when the oscillations of the local oscillator change in one predetermined direction only from the given frequency.

2. A self-adjusting control system having a tunable oscillator adapted to generate oscillations of a given frequency, an antenna pick-up system connected to the oscillator for modulating its frequency either above or below the predetermined frequency in response to the relative proximity of an object to the antenna, a discriminator connected with the output of the oscillator and operable to change the value of its output in coordination with frequency modulations of the oscillator above and below its given frequency, a potential sensitive means connected to, and controlled by, the output of the discriminator and operable to automatically tune the oscillator to generate oscillations at the given frequency, and a detector in the system tuned to operate a relay when the oscillations generated by the oscillator change in one predetermined direction only from its given frequency.

3. A self-adjusting control system having a local oscillator initially adapted to oscillate at a given frequency and including a parallel resonant circuit consisting of an inductance coil and an antenna system responsive to the presence of an object moving relative to the antenna system and thereby constituting a variable capacitance for the circuit, a discriminator connected to the output of the local oscillator and having its center frequency atuned to the given frequency of the local oscillator, said discriminator being operable to change the value of its output in response to a frequency change of the local oscillator above or below its given frequency, a reactance tube circuit connected to the resonant circuit of the oscillator and to the output of the discriminator and operable to impress on the resonant circuit of the local oscillator a corrective inductance to adjust the said oscillator for operation at the given frequency, a relay actuating detector in the system adapted to operate only when the oscillations of the local oscillator change in a predetermined direction from the given frequency, and a time delay means in the discriminator circuit to provide for actuation of the detector for a predetermined relay operating time interval.

4. A self-adjusting control system according to claim 3 characterized by the fact that the relay actuating detector is connected to the output of the local oscillator.

5. A self-adjusting control system according to claim 3 characterized by the fact that the relay actuating detector is connected to the output circuit of the discriminator.

6. A self-adjusting control system having a local oscillator initially adapted to oscillate at a given frequency and including a parallel resonant circuit consisting of a tunable inductance coil and an antenna system responsive to the presence of an object moving relative to the antenna system and thereby constituting a variable capacitance for the circuit, a discriminator connected to the output of the local oscillator and having its center frequency atuned to the given frequency of the local oscillator, said discriminator being operable to change the value of its output in response to a frequency change of the local oscillator above or below its given frequency, a potential sensitive reversible motor connected in the output of the discriminator, a rotor for said motor, and a drive connection between the rotor and the tunable element for the inductance coil in the resonant circuit, and a relay actuating detector in the system adapted to operate only when the oscillations of the local oscillator change in a predetermined direction from the given frequency.

7. A circuit consisting of a capacitance whose value is increased and decreased by the relative positions of an object to said capacitance, means for detecting said change in value of the capacitance, means for indicating the direction of said change in one predetermined direction only, and means for compensating for said change.

8. A circuit consisting of a capacitance whose value is changed by the relative positions of a movable object independent of the circuit and at a distance from the capacitance, an oscillator having the capacitance as a frequency shifting element, a discriminator for detecting shift of said frequency, a reactance tube circuit controlled by the discriminator to compensate for said shift, and a means for indicating the direction of said shift in one direction only.

References Cited in the file of this patent

UNITED STATES PATENTS

| | | |
|---|---|---|
| 2,112,826 | Cook | Apr. 5, 1938 |
| 2,355,395 | Rubenstein | Aug. 8, 1944 |
| 2,423,617 | Rath | July 8, 1947 |
| 2,428,290 | Peck | Sept. 30, 1947 |
| 2,558,435 | Hollingsworth | June 26, 1951 |